United States Patent [19]

Kukkala et al.

[11] Patent Number: 5,571,860

[45] Date of Patent: Nov. 5, 1996

[54] HIGH PERFORMANCE PVOH STABILIZED EVA ADHESIVES

[75] Inventors: Pravin K. Kukkala, Raritan; Malcolm F. Hallam, Branchburg, both of N.J.; M. Erin Jones, Newtown, Pa.; Richard K. Vetterl, Pompton Lakes, N.J.

[73] Assignee: National Starch and Chemical Investment Holding Corporation, Wilmington, Del.

[21] Appl. No.: 459,068

[22] Filed: Jun. 2, 1995

Related U.S. Application Data

[63] Continuation of Ser. No. 259,414, Jun. 14, 1994, abandoned.

[51] Int. Cl.$^6$ .................................................. C08L 29/04
[52] U.S. Cl. .................. 524/503; 524/271; 524/292; 524/297; 524/386; 524/387; 524/388; 524/427; 524/446; 524/447; 524/449; 524/459; 526/202
[58] Field of Search ..................... 524/459, 503; 526/202

[56] References Cited

U.S. PATENT DOCUMENTS

| | | | |
|---|---|---|---|
| 3,708,388 | 1/1973 | Lindemann et al. | 161/247 |
| 4,255,548 | 3/1981 | Wingard, Jr. et al. | 526/310 |
| 4,374,670 | 2/1983 | Slocombe | 106/20 |
| 4,595,737 | 6/1986 | Straub et al. | 526/264 |
| 4,647,611 | 3/1987 | Goldstein et al. | 524/458 |
| 4,745,025 | 5/1988 | Mao | 428/288 |
| 4,745,140 | 5/1988 | Goswami | 523/334 |
| 4,828,725 | 5/1989 | Lai et al. | 252/8.551 |
| 4,906,777 | 3/1990 | Pinschmidt, Jr. et al. | 564/215 |
| 4,911,960 | 3/1990 | Mudge et al. | 428/34.3 |
| 4,942,259 | 7/1990 | Parris et al. | 564/187 |
| 4,948,822 | 8/1990 | Iovine et al. | 523/201 |
| 5,037,927 | 8/1991 | Itagaki et al. | 526/307.7 |
| 5,059,713 | 10/1991 | Armor et al. | 564/187 |
| 5,086,111 | 2/1992 | Pinschmidt, Jr. et al. | 525/61 |
| 5,229,207 | 7/1993 | Paquette et al. | 428/355 |
| 5,262,008 | 11/1993 | Moench et al. | 162/168.2 |
| 5,290,880 | 3/1994 | Moench et al. | 525/369 |

FOREIGN PATENT DOCUMENTS

| | | |
|---|---|---|
| 0352442A2 | 1/1990 | European Pat. Off. . |
| 0546746A1 | 6/1993 | European Pat. Off. . |
| 0599245 | 6/1994 | European Pat. Off. . |
| 58-007472 | 1/1983 | Japan . |

*Primary Examiner*—Judy M. Reddick
*Attorney, Agent, or Firm*—Ellen T. Dec

[57] ABSTRACT

An emulsion adhesion composition comprising a polyvinyl alcohol stabilized polymer emulsion; the polymer comprising 40 to 94.5% by weight of a vinyl ester of an $C_1$–$C_{13}$ alkanoic acid, 5 to 40% by weight ethylene and 0.5 to 10% by weight N-vinyl formamide or N-vinyl pyrrolidone, the adhesive being characterized by superior adhesion and heat resistance.

11 Claims, No Drawings

HIGH PERFORMANCE PVOH STABILIZED EVA ADHESIVES

This application is a continuation of application Ser. No. 08/259,414, filed Jun. 14, 1994, now abandoned.

BACKGROUND OF THE INVENTION

Aqueous polyvinyl alcohol stabilized polymer emulsions comprising ethylene and vinyl esters, particularly vinyl acetate, as the major monomers find widespread applications as adhesives in the areas of packaging and converting and for vinyl laminating. For these uses, the adhesives are prepared and employed in emulsion form and, on removal of the aqueous medium, will cure or harden at room temperature to form a bond which is desirably characterized by high strength and resistance to heat, humidity and water.

The adhesives are particularly useful to provide laminates of woven and non-woven fabrics where the fabric itself is of cotton, polyolefin, polyester, polyamide (nylon), etc.; coated and uncoated paper and paperboard; films such as polyvinylidene chloride (PVDC), polyester, PVDC coated polyester, oriented and non-orientated polyethylene, polypropylene and polystyrene films, metallic foils and metallized films; and flexible cellular material such, for example, as polyurethane foams or sponge rubber. The laminates can be made of similar or dissimilar laminae and are useful in a wide variety of end-use applications including, for example, disposable flexible packaging, labelling, general packaging, cigarettes, envelopes, graphic arts and industrial uses such, for example, as weather stripping and electrical insulation.

Aqueous emulsion adhesives should be capable of providing an adhesive that can exhibit excellent adhesion to all types of substrates, excellent hot green strength, initial adhesion, resistance to thermal creep, heat resistance, high temperature bond strength, resistance to water, and low temperature adhesion. New technological developments in related fields such as plastics and high speed adhering machines, along with increasing needs for superior adhesion under various stringent conditions call for improved high performance adhesives. Typical examples are the widespread use of hydrophobic materials as substrates (difficult to bond substrates) such as metallized plastic films, water-repellent paper, resin coated papers, plastic to wood, etc., which necessitates the invention of novel adhesives also.

For example, the disposable wipe, bag and envelop industries would certainly benefit from an improved version of the existing aqueous based polymer adhesive base as it will reduce the need to formulate with plasticizers and tackifiers. Improving the polymer adhesive base will also lead to decreased levels of expensive plasticizers used, thereby lowering the cost.

In the case of microwaveable adhesives, better adhesion and heat resistance in a polymer base reduces the need to formulate with crosslinkers and can also increase shelf-life. Excessive crosslinking may lead to generation of a hard polymer which generally sacrifices adhesion to the substrate.

In the case of vinyl laminating, too soft a polymer results in poor heat resistance and poor bonds. At the same time, too hard a polymer will lead to poor adhesion characteristics. The existing latex based polymer bases generally suffer from low hot green strengths, poor heat resistance, and need further formulation to enhance specific adhesion characteristics.

This invention relates to an ethylene vinyl acetate copolymer emulsion adhesive that addresses many of the drawbacks of existing aqueous based adhesives such as those mentioned above. Such adhesives can be produced on an industrial scale without many changes from the currently used equipment.

SUMMARY OF THE INVENTION

The present invention is directed to a stable emulsion adhesive composition characterized by superior adhesion and heat resistant properties. These properties are achieved by the incorporation in the polyvinyl alcohol stabilized emulsion polymer of 0.5 to 10% (by weight) of N-vinyl formamide (NVF) or N-vinyl pyrrolidone (NVP).

In a preferred embodiment, these properties are even further improved by the additional incorporation of crosslinking and/or other functional comonomers.

The resultant polymers find specific use in a wide variety of applications, including those involving difficult to bond substrates such as in high performance microwave laminating (metallized polyester) adhesives, vinyl laminating adhesives, metal to wood adhesives, vacuum forming adhesives, envelope window film (polypropylene and polystyrene) adhesives as well as in bonding various paper and nonwoven substrates.

DETAILED DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate, vinyl versatate, etc., as well as mixtures thereof. Of the foregoing, vinyl acetate is the preferred monomer because of its ready availability and low cost.

Sufficient ethylene, generally from 5% up to a maximum of about 40%, by weight is added to achieve the desired Tg. For most applications a Tg of 0° to −30° C. and preferably −10° to −20° C. is preferred. These Tg (0° to −30° C.) correspond to ethylene contents of about 10 to 40% by weight.

The N-vinyl formamide or N-vinyl pyrrolidone monomer is added in amounts of 0.5 to 10% by weight, preferably 1.5 to 5%, by weight, of the total polymer solids. Other nitrogen containing copolymerizable monomers such as acrylamide, N-vinyl caprolactone, N-methylol acrylamide and their derivatives may also be present in total amount such that the total nitrogen containing monomers do not exceed about 10% by weight of the total polymer solids.

Further enhancement in adhesive properties may be obtained by the incorporation of crosslinkable monomers. N-vinyl formamide or N-vinyl pyrrolidone in combination with these types of monomers can be used over a wide pH range. These monomers are added in amounts of 0.5 to 10% by weight, preferably 1 to 5% by weight of the total polymer solids. The crosslinking agents can be either of the immediately-reactive type, or of the post-reactive type. Examples of the former are vinyl esters of polybasic acids, such as divinyl adipate, and divinyl succinate, divinyl ether, diallyl ether, allyl esters of polyfunctional acids, such as triallyl cyanurate, diallyl fumarate, triallyl citrate, and diallyl maleate, and other di- or tri-allyl compounds such as diallyl melamine. Examples of crosslinking agents of the post-reactive type are glycidyl compounds such as allyl glycidyl ether, glycidyl acrylate, glycidyl methacrylate, glycidyl vinyl ether, and the like; N-methylol compounds, such as N-methylol acrylamide, N-methylol methacrylamide, and their alkyl ethers, e.g., their methyl or butyl ethers.

The post-reactive agents partly crosslink during the formation of the vinyl acetate-ethylene copolymer and crosslinking is then completed, in conventional manner, by curing the copolymer at temperatures ranging from room temperature up to about 180° C., suitably in the presence of a curing catalyst, which is generally used in the amount of about 1 percent of the total resin. Appropriate curing catalysts for the various crosslinking agents are well known in the art. For example, various acidic or basic catalysts may be polymerized into the polymer backbone or added externally in order to induce catalysis.

Optionally, other copolymerizable monomers, such as acrylates, are added to enhance the polymerization reaction rate, allow for control of sequencing of monomer within the polymer backbone during polymerization and enable reproducible reactions. Such monomers generally are added in amounts 0.5 to 5% by weight. It will be understood that other comonomers conventionally used in compositions with ethylene and vinyl esters may also be present. In particular, certain copolymerizable monomers which assist in the stability of the copolymer emulsion, e.g., vinyl sulfonic acid and 2-acrylamido-2-methylpropane sulfonic acid or their salts may be used herein as latex stabilizers. If present, these stabilizers are added in amounts of from about 0.2 to 3% by weight of the monomer mixture.

In accordance with the procedure utilized herein, the vinyl acetate, ethylene, N-vinyl formamide and any optional monomers are polymerized in an aqueous medium under pressure not exceeding 100 atmospheres in the presence of an initiator and polyvinyl alcohol, the aqueous system being maintained preferably by a suitable buffering agent, at a pH of 2 to 7, the initiator being added incrementally. The reaction may be carried out using conventional batch or semi-batch (delayed addition ) procedure. In the latter and preferred cases, part of the vinyl acetate is charged initially to part of the aqueous phase in the polymerization vessel that also contains some protective colloids and then saturated with ethylene. Preferably 70% of the vinyl acetate is charged along with about 90% of the stabilization system and equilibrated with ethylene at 50° C. The remainder of the vinyl acetate, N-vinyl formamide and the optional monomers are premixed with the remainder of the stabilizing system in water and added incrementally during the course of the polymerization (known as delayed addition). Optional monomers that are premixed for the delayed addition include glycidyl methacrylate, acrylic acid, butyl acrylate, etc.

The delayed addition is conducted over a period of 1.5 hours to 4 hours and the reaction temperature is maintained between 75° and 90° C. The initiator solution is also added throughout the reaction period and 0.5 hour to 1 hour beyond the completion of the premixed delayed addition, to ensure low monomer residuals.

Suitable as polymerization initiators are the water-soluble free-radical-formers generally used in emulsion polymerization, such as hydrogen peroxide, sodium persulfate, potassium persulfate and ammonium persulfate, as well as t-butyl hydroperoxide, in amounts of between 0.01 and 3% by weight, preferably 0.1 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, ascorbic acid, erythrobic acid as redox catalysts in amounts of 0.01 to 3% by weight, preferably 0.1 to 1% by weight, based on the total amount of the emulsion. The free-radical-formers can be charged in the aqueous emulsifier solution or be added during the polymerization in doses.

As a protective colloid herein, polyvinyl alcohol is preferred and is used in amounts of 1 to 6% by weight. It is possible to use the colloid alone or in mixtures with other emulsifiers which may be anionic or non-ionic surface-active compounds. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethoxylated alkanols and alkylphenols, as well as esters of sulfosuccinic acid. Examples of suitable non-ionic emulsifiers are the addition products of 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof. Preferably the emulsifiers are used in amounts of 0.2 to 2% by weight of the polymer.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, including mercaptans such as mercaptoacetic acid and mercaptoethanol; aldehydes; chloroform; methylene chloride and trichloroethylene, may also be added.

The reaction is generally continued until the residual vinyl acetate content is below about 1%. The completed reaction product is then allowed to cool to about room temperature, while sealed from the atmosphere. The pH may then be suitably adjusted to insure maximum stability. Other adjustments or additions may optionally be made at this time, as desired.

The precise formulation of the adhesives into which the ethylene vinyl acetate emulsion are incorporated will vary depending upon the specific end use. The emulsion may be used "neat". In general, in these cases, the ethylene vinyl acetate polymer is present in the adhesive in the form of an aqueous dispersion at levels of 65 to 90 parts by weight. Additional polyvinyl alcohol may be added to the waterborne adhesive formulation to a total level of 0.1 to 10 parts by weight, preferably 0.5 to 5.0 parts by weight of the total adhesive formulation. The emulsion may also be formulated using converted amounts of other additives traditionally used in these types of adhesives, such as, plasticizers, defoamers, preservatives, thickeners, humectants, fillers, and tackifiers, with sufficient water to obtain a desired application viscosity.

If present, one or more of those plasticizers conventionally used in vinyl acetate-based waterborne packaging adhesives may be used in the adhesive formulation. Representative plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. The plasticizer is generally used in amounts of 2 to 20 parts by weight, preferably 3 to 15 parts.

If present, tackifiers generally will be used in dispersion form at 40% to 65% solids in amounts up to about 20 parts by weight, preferably 2 to 10 parts. Representative tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamideformaldehyde resin, and wood rosin.

Suitable thickeners include oliginates, bentonite, casein, fumed silica, guar gum, gum tragacanth, hydroxyethylcellulose, locust been gum, methylcellulose, polyacrylic acid salts (ammonium, potassium, sodium(, polyvinyl alcohol, sodium carboxymethyl cellulose, and starches, and if present, will be used in amounts up to about 5 parts by weight.

Useful fillers include bentonite, calcium carbonate, calcium silicate, clay, mica, nut shell flours, silica, talc, uncooked starches, and wood flour, and if present, will be used in amounts up to about 20 parts by weight.

Suitable humectants include calcium chloride, diethylene glycol, glycerine, hexylene glycol, propylene glycol, magnesium chloride, sodium nitrate, sorbitol, sucrose, and urea, and if present, will be used in amounts up to about 20 parts by weight.

The resultant adhesives, when appropriately formulated, may be used in virtually any packaging and converting applications in which waterborne adhesives are commonly employed, including case and carton forming and sealing, tube winding, bag manufacture, glued lap, paper and flexible film laminating.

EXAMPLE A

This example illustrates the semi-batch polymerization procedure used in preparing the high performance adhesive latexes of the present invention.

To a 10 liter autoclave was charged 350 g (of a 25% w/w solution in water) of low viscosity 88% hydrolyzed polyvinyl alcohol, 721 g (of a 10% w/w solution in water) of medium viscosity 88% hydrolyzed polyvinyl alcohol, 16.1 g (of a 70% w/w solution in water) alkyl aryl polyethylene oxide (40 moles ethylene oxide), 4.2 g (of a 30% w/w solution in water) sodium salt of a carboxylated polyelectrolyte, 7.5 g (of a 1% w/w solution in water) ferrous sulfate solution, 2 g sodium formaldehyde sulfoxylate and 1400 g of water. The pH was adjusted to 5.0 with dilute phosphoric acid.

After purging with nitrogen, 2660 g of vinyl acetate was charged to the reactor. The reactor was then pressurized to 680 psi with ethylene and equilibrated at 50° C. for 15 minutes. The polymerization was then initiated by metering in a solution of 15 g of tertiary butyl hydroperoxide (t-BHP) in 250 g of water and 10 g of ascorbic acid in 250 g of water over 3.5 hours.

On obtaining a two degree exotherm, an emulsified premix containing 700 g water, 50 g (of a 25% w/w solution in water) of low viscosity 88% hydrolyzed polyvinyl alcohol, 100 g (of a 10% w/w solution in water) of medium viscosity 88% hydrolyzed polyvinyl alcohol, 5.4 g (of a 70% w/w solution in water) alkyl aryl polyethylene oxide (40 moles ethylene oxide) and 1140 g of vinyl acetate, was concurrently added with the initiators over a period of 2.5 to 3 hours.

The reaction temperature was then allowed to rise to 75° to 78° C. over 1 hour and maintained at this temperature during the polymerization by means of external cooling or heating. Ethylene pressure was maintained at 1200 psi for a period of two hours. At the end of the initiator slow additions, the product was transferred to an evacuated vessel (30 L) to remove residual ethylene from the system.

In the above example, the ratio of vinyl acetate in the initial charge to vinyl acetate in the slow-add (or premix) charged to the reactor is 7:3. The process produced a latex of 55% solids and a $T_g$ of −15° C.

EXAMPLE B

Using the above procedure, 76 g of N-vinyl formamide was slow-added into the reactor by preemulsifying with the rest of the monomer premix. The preemulsified solution was stable and the final product (latex) was also stable.

EXAMPLE C

Using the procedure in Example A, 152 g of N-vinyl formamide was slow-added into the reactor by preemulsifying with the rest of the monomer premix. In addition, the concentrations of the oxidizing agent (t-butylhydroperoxide) was decreased to 12 g and that of the reducing agent (ascorbic acid) to 8 g. The preemulsified solution was stable and the final product (latex) was also stable.

EXAMPLE D

Using the procedure in Example A, 152 g of N-vinyl formamide was slow-added into the reactor by preemulsifying with the rest of the monomer premix. The preemulsified solution was stable and the final product (latex) was also stable.

EXAMPLES E AND F

Using the procedure in Example C, 76 g of N-vinyl formamide, 76 g of glycidyl methacrylate (GMA), 76 g of acrylic acid and 76 g of butyl acrylate were slow-added into the reactor by preemulsifying with the rest of the monomer premix. The preemulsified solution was stable and the final product (latex) was also stable. The procedure was repeated and the second sample designated Example F.

EXAMPLE G

Using the procedure in Example C, 152 g of Novinyl formamide, 76 g of glycidyl methacrylate (GMA), 76 g of acrylic acid and 76 g of butyl acrylate were slow-added into the reactor by preemulsifying with the rest of the monomer premix. The preemulsified solution was stable and the final product (latex) was also stable.

EXAMPLE H

Using the same procedure as in Example C, the following modifications were made to the recipe: The initial charge consisted of 352 g (of a 25% w/w solution in water) of low viscosity, 88% hydrolyzed polyvinyl alcohol, 507 g (of a 10% w/w solution in water) of medium viscosity, 88% hydrolyzed polyvinyl alcohol, 19 g (of a 70% w/w solution in water) alkyl aryl polyethylene oxide (40 moles ethylene oxide), 3.74 g (of a 30% w/w solution in water) sodium salt of a carboxylated polyelectrolyte, 8.8 g (of a 1% w/w solution in water) ferrous sulfate solution, 10% of the reducing agent solution (given below) and 1400 g of water.

The pH was adjusted to 4.1 with dilute phosphoric acid.

After purging with nitrogen, 2310 g of vinyl acetate was charged to the reactor. The reactor was then pressurized to 625 psi with ethylene and equilibrated at 50° C. for 15 minutes. The polymerization was then initiated by metering in a solution of 17.2 g of tertiary butyl hydroperoxide (t-BHP) in 200 g of water, and 10.5 g of ascorbic acid with 1.4 g sodium acetate in 200 g of water (reducing agent solution) over 3.5 hours.

On obtaining a two degree exotherm, an emulsified premix solution containing 499 g water, 50 g (of a 25% w/w solution in water) of low viscosity, 88% hydrolyzed polyvinyl alcohol, 71 g (of a 10% w/w solution in water) of medium viscosity, 88% hydrolyzed polyvinyl alcohol, 4.4 g (of a 70% w/w solution in water) alkyl aryl polyethylene oxide (40 moles ethylene oxide), 990 g of vinyl acetate, and 103 g of N-vinyl pyrrolidone was concurrently added with the initiator solutions over a period of 2.5 to 3 three.

The reaction temperature was then allowed to rise to 82° C. over 1 hour and maintained at this temperature during the polymerization by means of external cooling or heating. Ethylene pressure was maintained at 1100 psi for a period of 2 hours. At the end of the initiator slow additions, the product was transferred to an evacuated vessel (30L) to remove residual ethylene from the system. A defoamer such as Colloid 681F was post-added when the product cooled.

In the above example, the ratio of vinyl acetate in the initial charge to vinyl acetate in the slow-add (or premix) charged to the reactor is 7:3. The process produced a latex of 55% solids and a $T_g$ of −12° C.

EXAMPLE I

Using the procedure in Example C, the level of N-vinyl pyrrolidone in the premix emulsion was increased to 206 g. In addition, the alkyl aryl polyethylene oxide (40 moles ethylene oxide) surfactant was deleted from both the initial charge and the premix solution. The preemulsified solution was stable and the final product (latex) was also stable.

The compositions are described in Table I. Percentages of NVF and optional monomers are based on the weight of ethylene vinyl acetate.

TABLE I

| EXAMPLE # | VARIATION | cps VISCOSITY | % SOLIDS | pH | Tg C |
|---|---|---|---|---|---|
| A | CONTROL | 3300 | 55.8 | 3.8 | −15 |
| B | 1.5% NVF | 3970 | 57.8 | 4.3 | −8 |
| C | 3% NVF, low catalyst | 3680 | 57.5 | 4.2 | −4 |
| D | 3% NVF | 4560 | 57 | 4.2 | −11 |
| E | 1.5% NVF/1.5% GMA/1.5% AA/1.5% BA | 2620 | 58.7 | 4.2 | −11 |
| F | 1.5% NVF/1.5% GMA/1.5% AA/1.5% BA | 3280 | 58.1 | 4.2 | −13 |
| G | 3% NVF/1.5% GMA/1.5% AA/1.5% BA | 9050 | 58.3 | 3.8 | −8 |
| H | 1.5% NVP | 1400 | 55.6 | 3.3 | −12 |
| I | 3.0% NVP | 1600 | 55.8 | 3.7 | −7 |

The resulting adhesives were tested using the following procedures:

Packaging and Converting Adhesives

Typical packaging and converting adhesives are prepared with 30 to 100 parts by weight of the polyvinyl alcohol stabilized polymer, 0 to 20 parts by weight plasticizer, 0 to 10 parts by weight additional polyvinyl alcohol, 0 to 20 parts by weight tackifier, 0 to 20 parts by weight filler, and 0 to 20 parts by weight humectant.

In this testing, the polymer was evaluated in the following formulation:

Formula 1:

| Water | 5.0 |
|---|---|
| Partially hydrolyzed PVOH: Airvol 540, Air Products | 1.0 |
| Defoamer: Foammaster III, Henkel Corp. | 0.2 |
| 190 to 200° F. Hold 30 minutes | |
| Cool to below 140° F., add: | |
| Polymer | 90.0 |
| Defoamer: Foammaster III, Henkel Corp. | 0.2 |
| Polypropylene glycol P1200, Dow Chemical Co. | 0.2 |
| Potassium sorbate | 0.15 |
| Products adjusted to 1800 to 2200 cps with water | |

Microwave Adhesion

Laminations were prepared with Formula 1 using either a #20 or a #12 wirewound bar, coating the metal side of the metallized polyester and immediately mating the uncoated side of C1S (coated one side) SBS paperboard (solid bleach sulfate). Bonds were compressed using a hand roller and then cured for 24 hours at room temperature. Laminations were then evaluated for strength of adhesion and degree of fiber tear using an Instron and hand pulls. (Optimal adhesive performance indicated by 100% fiber tear.)

Microwave Resistance (Same bonding procedure as above.)

Bonds were tested by placing the lamination (film side up) in a microwave with a beaker of water containing approximately 100 mg of water. Laminations were then microwaved for 30 seconds on high power. The degree of microwave resistance is characterized by the size and extent of cracking and crazing of the polyester film. A lower number indicates less cracking and crazing and thus better microwave resistance.

Heat Peel

The adhesive was applied to the uncoated side of the C1S SBS paperboard and immediately bonded to the coated side of another SBS paperboard. Adhesive application began at the half-way point of board. All bonds were cured for 24 hours at room temperature. Bonds were hole punched at one end and then separated and folded to form a "T".

One end (top) is hung from an oven rack; a 50 g weight is suspended from the other end (bottom). Bonds are heated beginning at 300° F. Temperature is held for 5 minutes, increased by 30° F., and held for 5 minutes. Increments are repeated until all bonds fail. The temperature at which each bond fails is noted. Higher temperatures indicate better heat resistance.

Disposable Adhesion

Laminations were prepared with the neat polymer emulsions using either a #20 or a #12 wirewound, coating the treated polyethylene and immediately mating the nonwoven. Bonds were compressed using a hand roller and cured for 24 hours at room temperature. Laminations were then evaluated for strength of adhesion and degree of nonwoven tear using both an Instron and hand pulls. For these tests, a #12 wirewound adhesive coating generates results that are more discriminating that those obtained by using a #20 wirewound adhesive coating.

Envelope Adhesion

Bonds were prepared with the neat polymer emulsions using a 0.25 and 0.50 mil bird applicator. The adhesive was applied to 24 substance weight virgin white wove and immediately bonded to:

1) Avpexine (oriented polystyrene) (AVP Extrusions Ltd.)
2) Untreated polypropylene Bonds were evaluated for strength of adhesion and degree of fiber tear.

The results of the tests are printed in Table II. In this table, the sample designated "Control" contains no vinyl formamide or NVP. Test results are based on Instron machine pulls.

The samples were also evaluated for both microwave and disposable adhesives using hand pulls. Here, the bonds are separated by hand, and adhesion characteristics are observed. Hand pull test are more discriminating than machine pull tests. In addition, the envelope group evaluated adhesion to polypropylene and polystyrene.

The results of the testing are shown in Tables II and III.

improvement over 3% NVF. In fact, Sample C (3% NVF with a Tg of −4° C.) did not demonstrate any improvement over Sample B, but this is due to the relative hardness of Sample C. However, when the polymer was softened (lower Tg) at the same NVF level, the performance significantly improved. Furthermore, combining NVF with GMNAA boosted adhesion further with Sample G (3% NVF/1.5% GMA/1.5% AA) demonstrating the best adhesion to the metallized polyester.

It is interesting to note that in the case of microwave adhesion, the introduction of a latent crosslinking system containing an in-situ catalyst as in Samples E, F and G show marked improvements to the existing improved adhesive based on NVF only. Both the machine tests and Hand Pull tests confirm this trend.

TABLE II

| | MACHINE TESTS | | | | |
|---|---|---|---|---|---|
| EXAMPLE # | MICROWAVE ADHESION | MICROWAVE RESISTANCE | HEAT PEEL °F. | #20 WIREWOUND DISPOSABLE ADHESION | #12 WIREWOUND DISPOSABLE ADHESION |
| A (CONTROL) | 1.34 43% | 3.2 | 380 | 0.85 87% | 0.32 0% |
| B | 1.33 98% | 2 | 392 | 0.91 83% | 0.73 5% |
| C | 1.37 73% | 4.0 | >440 | 1.00 88% | 0.83 48% |
| D | 1.23 90% | 3.5 | >440 | 0.97 100% | 1.1 48% |
| E | 0.93 100% | 2.8 | >440 | 0.91 100% | — |
| F | 1.22 90% | 2 | >440 | 1.01 75% | — |
| G | 1.13% 100% | 2.7 | 430 | 0.82 100% | — |
| H | — | 3.0 | 380 | — | 0.84 50% |
| I | — | 3.0 | 380 | — | 0.95 78% |

Legend:
Bond Strength: pli
Fiber tear: %
Microwave Resistance: 1 = good, 4 = poor
Heat peel: °F.

TABLE III

| | HAND PULL TESTS | | | | | |
|---|---|---|---|---|---|---|
| EXAMPLE # | MICRO ADH | DISP ADH | PP 0.25 mil | PP 0.50 mil | PS 0.25 mil | PS 0.50 mil |
| A (CONTROL) | Metal Pull | 2% f.t. | zipper | zipper | suction | suction |
| B | 75% f.t. | 25% f.t. | stronger | stronger | some distortion | film distortion |
| C | Metal Pull | 45% f.t. | zipper | zipper | some film distortion | slight f.t., film distortion |
| D | 50% f.t | 45% f.t. | zipper | zipper | suction | very tight suction; some f.t. |
| E | 80% f.t. | 60% f.t. | zipper | tighter | tight suction | some f.t. |
| F | 85% f.t. | 30% f.t. | zipper | tighter | weak suction | sl. film distortion |
| G | 99% f.t. | 10% f.t. | zipper | zipper | weak suction | weak suction |
| H | 98% f.t. | — | suction | strong suction | strong suction | 20% f.t. |
| I | 100% f.t. | — | suction | very strong suction | strong suction | 40% f.t. |

NOTE:
Hand pull tests are more discriminating than machine tests.
Fiber tear is a better indication of strength of bond.
Higher the fiber tear, better/stronger the bond.
f.t.: Fiber Tear Microwave adhesion and disposable adhesion tests were conducted on a #12 wirewound adhesive coating.

The results from the machine tests (for metallized polyester) show that the adhesion with 1.5% NVF provided a better adhesion than the control and also more of an Incorporation of NVF also improves adhesion to the disposable substrates with 3% NVF showing an advantage over 1.5% (Sample B). The adhesion of Sample B can be further enhanced and out perform both 3% NVF samples when combined with GMA/AA and 1.5% NVF (Samples E and G). in this case Sample F, which is essentially identical in composition to Sample E, exhibits a less significant improvement. This fact may be due to difficulties encountered in coating the flexible disposable substrates. Combining GMA/AA with a higher level (3%) of NVF (Sample G) appears to decrease adhesion but is still far superior to the control Sample A.

From the hand pull test results in Table III, it is observed that the presence of NVF at any level overwhelmingly improves the adhesion characteristics to both microwave laminating base as well as for the disposable substrates. These are significant improvements over the control sample.

In general, the Hand Pull tests have been observed to generate more realistic and reliable results. In addition, the extent of fiber tear is an indication of the improvement in adhesion. For example, the fiber tear in the control sample was only 0 to 2%, whereas the experimental samples generated a fiber tear in the range of 10 to 60%.

In addition, it is observed from Table II that the heat peel (° F) temperature increases significantly as the level of NVF increases (as compared to the control sample) and reaches the maximum derived (>440° F). Furthermore, the incorporation of oxirane rings via glycidyl methacrylate along with an in-situ catalyst such as acrylic acid, enables the adhesive to generate consistently high heat peel temperature.

In the area of microwave resistance, low values were observed with Sample B (1.5% NVF) and Sample F (1.5% NVF/1.5% GMA/1.5% AA), and high values were observed when 3% NVF was incorporated alone. (Again, Samples E and F showed some minor variation in results.) However, these samples overall were the best in terms of heat resistance as evaluated by heat peel.

In the case of N-vinyl pyrrolidone, similar performance results were obtained as in the case of NVF. The adhesion to disposable substrates increased significantly on incorporation of NVP (Examples H and I). As the level of NVP increased from 1.5% to 3%, the adhesion strength and fiber tear also increased significantly. The microwave adhesion tests results were similar or better than the control.

This series was also evaluated for adhesion to two different envelope window films, polypropylene and reoriented polystyrene (Table III). The envelope industry would certainly benefit from an improved adhesion version of control (Sample A) which would allow them to decrease the level of plasticizer currently used in these formulations. Products were evaluated neat at 0.25 mil and 0.5 mil application levels. No significant improvement was noted on the polypropylene film, but Sample B (1.5% NVF) provided the strongest bond. However, on the polystyrene, 3% NVF alone and 1.5% NVF in combination with GMA/AA demonstrated reasonable fiber tear indicating improved adhesion. The results indicate that in the case of polypropylene, NVP performed far superior to the control. The adhesion significantly improved (stronger suction) as the level of NVP increased (Sample I). In the case of polystyrene substrate, significant increase in bond strength (high fiber tear) was obtained at both 1.5% and 3.0% NVP levels.

Vinyl Laminating

Typical vinyl laminating adhesives are prepared from 75 to 97 parts by weight of the polymer emulsion, 0 to 20 parts by weight plasticizer, 0.05 to 0.5 parts by weight wetting agent, 0 to 10 part by weight filler and 0 to 10 parts by weight humectant with minor amounts of other convention additives.

In this case, the vinyl laminating tests were performed using formulated samples containing 8.5% dibenzoate plasticizer, 0.2% wetting agent, 0.1% to defoamer and 0.1% preservative. Viscosity was adjusted to specification of 4000 to 5000 cps.

The formulated adhesive is then used to bond vinyl to a rigid substrate in this case particle board (PB) although lauan, hardboard, plywood, or medium density fiberboard (MDF) could also be used. Bonds are made via wet combine and thermoplastically at 220° and 180° F. mounting (glue line) temperatures. In the wet combine process the adhesive is coated onto the board and the vinyl is nip rolled onto the wet glue line. Construction is then dead stacked overnight to allow it to dry/cure. In thermoplastic mounting, also known as dry combine, the adhesive is coated onto the board, force dried with heat and brought up to the appropriate glue line temperature at which time the vinyl is nip rolled onto the board.

Bonds are tested immediately for hot green strength values. The construction is then allowed to cure overnight at room temperature (R.T.). Bonds are then tested in 180° peel mode for strength values and checked for zippy bond. A zippy bond is one that allows the vinyl to be removed cleanly from the board with a strong sudden pull, and is usually a undesirable property of the adhesive.

NVF containing Samples B, C and D were tested and all showed significantly increased vinyl to particle board bond strength relative to the control Sample A. In addition, the green strength was also improved significantly and bonds were not zippy. Test results are on attached Table IV. The samples when tested, again exhibited high thermoplastic mounting bond strengths at both 220° F. and 180° F. The hot green strengths were also high.

However, in the case of vinyl laminating samples containing NVP, no significant improvement was observed. For aqueous based systems, a thermoplastic mounting bond strength of over 6 psi is considered excellent, and a hot green strength of over 1 psi is also considered as excellent.

TABLE IV

| | VINYL-LAMINATING TEST RESULTS | | | | | | |
|---|---|---|---|---|---|---|---|
| | BONDS STRENGTHS (psi) | | | | | | |
| SAMPLE # (Formulated) | WET | THERMO 220° C. | HOT GREEN | ZIP | THERMO 180° C. | HOT GREEN | ZIP |
| A (Control) | 8.75 | 4.0 | 1.0 | Y | 3.75 | 1.0 | Y |
| B | 9.0 | 6.75 | 1.25 | N | 7.75 | 0.75 | N |
| C | 9.25 | 8.0 | 1.5 | N | 7.75 | 2.5 | N |
| D | 9.75 | 8.5 | 2.25 | N | 6.75 | 2.0 | N |
| E | 9.5 | 4.5 | 1.0 | Y | 3.75 | 0.75 | Y |
| F | 9.25 | 2.75 | 1.75 | Y | 3.0 | 1.25 | Y |
| G | 9.0 | 3.5 | 0.5 | Y | 3.0 | 0.5 | Y |

TABLE IV-continued

VINYL-LAMINATING TEST RESULTS

BOND STRENGTHS (psi)

| SAMPLE # (Formulated) | WET | THERMO 220° C. | HOT GREEN | ZIP | THERMO 180° C. | HOT GREEN | ZIP |
|---|---|---|---|---|---|---|---|
| H | 8.5 | 5.75 | 0.75 | Y | 3.0 | 1.0 | Y |
| I | 8.0 | 1.75 | 0.5 | Y | 1.0 | 1.0 | Y |
| REPEAT TESTS: | | | | | | | |
| B | 8.0 | 8.0 | 1.75 | N | 8.25 | — | N |
| C | 10.0 | 8.25 | 1.75 | N | 8.0 | 2.5 | N |
| D | 9.5 | 8.0 | 2.0 | N | 7.5 | 2.25 | N |

The testing results also show that samples prepared with GMA and/or N-vinyl pyrrolidone did not exhibit as superior results indicating that such emulsion polymers are not especially suited for vinyl laminating applications wherein the substrates are very different in properties from those used, for example, in packaging and converting applications.

We claim:

1. An aqueous emulsion adhesive composition comprising a polyvinyl alcohol stabilized polymer emulsion; the polymer comprising 40 to 94.5% by weight of a vinyl ester of a C1-C13 alkanoic acid, 5 to 40% by weight ethylene and 0.5 to 10% by weight N-vinyl formamide, the amounts total 100%, the adhesive being characterized by superior adhesion and heat resistance.

2. The emulsion adhesive of claim 1 wherein the polymer additionally contains 0.5 to 10% by weight of a crosslinkable monomer selected from the group consisting of divinyl adipate, divinyl succinate, divinyl ether, diallyl ether, triallyl cyanurate, diallyl fumarate, triallyl citrate, diallyl maleate, diallyl melamine, allyl glycidyl ether, glycidyl acrylate, glycidyl methacrylate, glycidyl vinyl ether, N-methylol acrylamide, N-methylol methacrylamide and the methyl and butyl ethers thereof.

3. The emulsion adhesive of claim 2 wherein the crosslinkable monomer is glycidyl methacrylate.

4. The emulsion adhesive of claim 2 wherein the polymer additionally contains 0.5 to 5% by weight of a monomer selected from the group consisting of butyl acrylate, vinyl pivalate and 2-ethyl hexyl acrylate.

5. The emulsion adhesive of claim 1 wherein the vinyl ester is vinyl acetate.

6. The emulsion adhesives of claim 1 wherein the N-vinyl formamide is present in an amount of 1.5 to 5% by weight.

7. An emulsion adhesive composition suitable for packaging and converting applications comprising:
   a) 30 to 100 parts by weight of a polyvinyl alcohol stabilized polymer emulsion; the polymer comprising 40 to 94.5% by weight of a vinyl ester of a C1–C13 alkanoic acid, 5 to 40% by weight ethylene and 0.5 to 10% by weight N-vinyl formamide, the amounts to total 100%;
   b)
      i) 0 to 20 parts by weight plasticizer;
      ii) 0 to 10 parts by weight polyvinyl alcohol;
      iii) 0 to 20 parts by weight tackifier;
      iv) 0 to 20 parts by weight filler;
      v) 0 to 20 parts by weight humectant; wherein the parts by weight of components i)–v) are based on total adhesive composition.

8. The emulsion adhesive of claim 7 wherein the polymer additionally contains 0.5 to 10% by weight of a crosslinkable monomer selected from the group consisting of divinyl adipate, divinyl succinate, divinyl ether, diallyl ether, triallyl cyanurate, diallyl fumarate, triallyl citrate, diallyl maleate, diallyl melamine, allyl glycidyl ether, glycidyl acrylate, glycidyl methacrylate, glycidyl vinyl ether, N-methylol acrylamide, N-methylol methacrylamide and the methyl and butyl ethers thereof.

9. The emulsion adhesive of claim 8 wherein the crosslinkable monomer is glycidyl methacrylate.

10. The emulsion adhesive of claim 8 wherein the polymer additionally contains 0.5 to 5% by weight of a monomer selected from the group consisting of butyl acrylate, vinyl pivalate and 2-ethyl hexyl acrylate.

11. An emulsion adhesive composition suitable for vinyl laminating comprising:
   a) 75 to 99.95 parts by weight of a polyvinyl alcohol stabilized polymer emulsion; the polymer comprising 40 to 94.5% by weight of a vinyl ester of a C1–C13 alkanoic acid, 5 to 40% by weight ethylene and 0.5 to 10% by weight N-vinyl formamide, the amounts to total 100%;
   b)
      i) 0 to 20 parts by weight plasticizer;
      ii) 0.05 to 0.5 parts by weight wetting agent;
      iii) 0 to 10 parts by weight filler;
      iv) 0 to 10 parts by weight humectant; wherein the parts by weight of components i)–iv) are based on total adhesive composition.

* * * * *